(12) United States Patent
Li et al.

(10) Patent No.: US 10,791,515 B2
(45) Date of Patent: Sep. 29, 2020

(54) PHYSICAL LAYER PROTOCOL AND SUBFRAME STRUCTURE FOR WEARABLE USER EQUIPMENT DEVICES

(71) Applicant: Apple Inc., Cupertino, CA (US)

(72) Inventors: Qian Li, Beaverton, OR (US); Guangjie Li, Beijing (CN); Xiaoyun May Wu, Shanghai (CN); Geng Wu, Portland, OR (US)

(73) Assignee: APPLE INC., Cupertino, CA (US)

( * ) Notice: Subject to any disclaimer, the term of this patent is extended or adjusted under 35 U.S.C. 154(b) by 61 days.

(21) Appl. No.: 16/067,669

(22) PCT Filed: Jun. 27, 2016

(86) PCT No.: PCT/US2016/039521
§ 371 (c)(1),
(2) Date: Jul. 2, 2018

(87) PCT Pub. No.: WO2017/146757
PCT Pub. Date: Aug. 31, 2017

(65) Prior Publication Data
US 2019/0021053 A1   Jan. 17, 2019

Related U.S. Application Data

(60) Provisional application No. 62/300,332, filed on Feb. 26, 2016.

(51) Int. Cl.
*H04W 52/02* (2009.01)
*H04L 5/00* (2006.01)
(Continued)

(52) U.S. Cl.
CPC ....... *H04W 52/0216* (2013.01); *H04L 5/0037* (2013.01); *H04L 5/0044* (2013.01); *H04L 5/0048* (2013.01); *H04L 5/0053* (2013.01); *H04W 4/80* (2018.02); *H04W 8/005* (2013.01); *H04W 52/0229* (2013.01);
(Continued)

(58) Field of Classification Search
CPC ......... H04W 52/0216; H04W 52/0229; H04W 4/80; H04W 8/005; H04W 76/27; H04W 72/1289; H04L 5/0053; H04L 5/0048; H04L 5/0044; H04L 5/0037;
(Continued)

(56) References Cited

U.S. PATENT DOCUMENTS

2010/0110948 A1   5/2010   Batta
2011/0170511 A1   7/2011   Chen
(Continued)

FOREIGN PATENT DOCUMENTS

EP   2942881 A1   11/2015
EP   3065468 A1   9/2016
WO   2015065073 A1   5/2015

OTHER PUBLICATIONS

PCT/US2016/039521, International Search Report and Written Opinion, dated Dec. 20, 2016, 21 pages.

*Primary Examiner* — Curtis A Alia

(57) ABSTRACT

This disclosure describes frame structures and layer one (L1) procedures suitable for Xu air interfaces. Features of the design are designed for energy-efficient operation and to meet other performance specifications and characteristics of ultra-dense user equipment deployments.

16 Claims, 10 Drawing Sheets

(51) Int. Cl.
    *H04W 8/00*     (2009.01)
    *H04W 4/80*     (2018.01)
    *H04W 72/12*     (2009.01)
    *H04W 76/27*     (2018.01)

(52) U.S. Cl.
    CPC ........ *H04W 72/1289* (2013.01); *H04W 76/27* (2018.02); *Y02D 70/1262* (2018.01); *Y02D 70/142* (2018.01); *Y02D 70/144* (2018.01); *Y02D 70/164* (2018.01); *Y02D 70/166* (2018.01); *Y02D 70/26* (2018.01)

(58) Field of Classification Search
    CPC ............. Y02D 70/1262; Y02D 70/166; Y02D 70/142; Y02D 70/26; Y02D 70/164; Y02D 70/144
    See application file for complete search history.

(56) References Cited

U.S. PATENT DOCUMENTS

| | | |
|---|---|---|
| 2015/0373656 A1 | 12/2015 | Kim et al. |
| 2016/0044634 A1 | 2/2016 | Seo et al. |
| 2016/0142974 A1* | 5/2016 | Lindoff ............. H04W 52/0209 370/311 |

* cited by examiner

PHYSICAL LAYER PROTOCOL AND SUBFRAME STRUCTURE FOR WEARABLE USER EQUIPMENT DEVICES

RELATED APPLICATION

This application is a national stage filing under U.S.C. § 371 of International Patent Application No. PCT/US2016/039521, filed Jun. 27, 2016, which claims benefit of U.S. Provisional Patent Application No. 62/300,332, filed Feb. 26, 2016, each of which is hereby incorporated by reference herein in its entirety.

TECHNICAL FIELD

This disclosure relates generally to communication systems supporting wearable user equipment (UE) devices, and, more specifically, to an interface layer-one (L1) procedure and radio frame and subframe structures for allocating physical resources between wearable user equipment (wUE) devices (or simply, wUEs) and network UEs (nUEs).

BACKGROUND INFORMATION

Some devices currently use Bluetooth®, Bluetooth® Low Energy (Bluetooth® LE, BLE, marketed as Bluetooth® Smart), or other short-range wireless personal area network technologies for exchanging data over short distances. Bluetooth®, however, is limited to a three megabit per second (Mbit/s) over-the-air data rate and exhibits poor performance in ultra-dense deployments characterized by many devices communicating in a relatively small area (e.g., a subway). Other wireless local area networking (WLAN) technologies, such as Wi-Fi®, consume relatively high amounts of power that may not be available in mobile devices.

Aspects and advantages will be apparent from the following detailed description of embodiments, which proceeds with reference to the accompanying drawings.

DETAILED DESCRIPTION OF EMBODIMENTS

Figure 1:
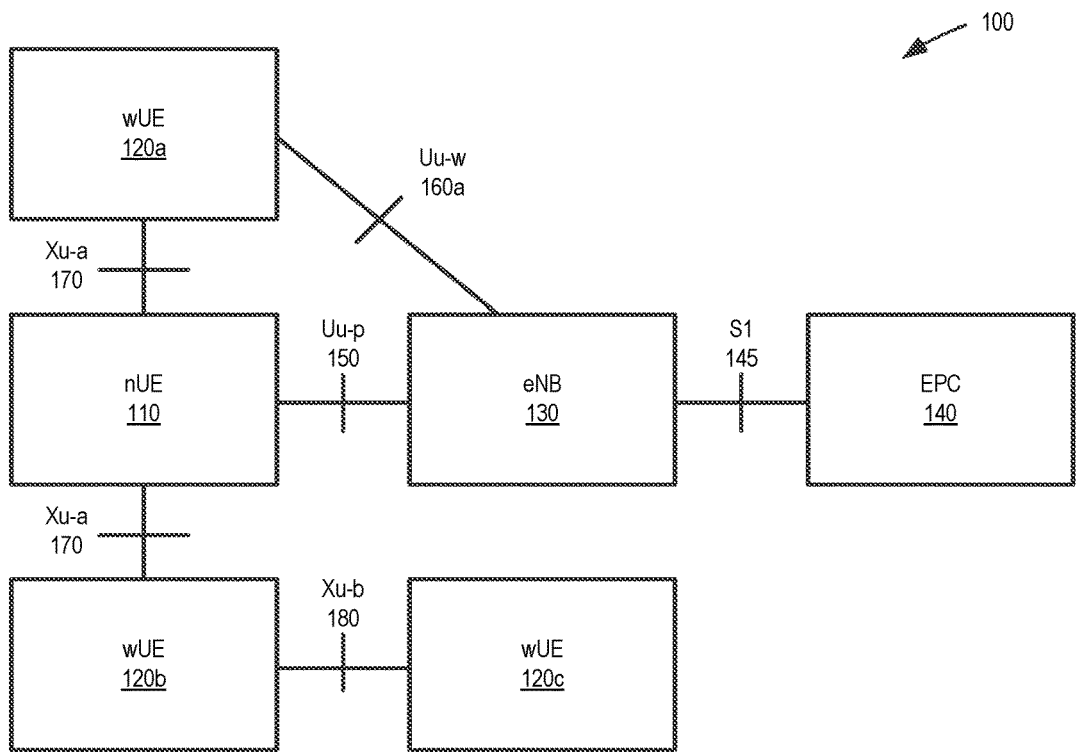
FIG. 1 is a block diagram of a system architecture for supporting wUEs in communication with a network UE (nUE) through an Xu-a air interface.

FIG. 1 shows a communication system 100 for supporting wUEs. Entities of the system 100 include an nUE 110 having a full infrastructure network-access protocol stack (i.e., for full control- and user-plane functions); several wUEs 120 (e.g., 120a, 120b, and 120c) lacking standalone network-access connections but instead achieving network-access through, and coordinated by, the nUE 110; a EUTRAN Node B (or more generally, a base station) 130; and an evolved packet core (EPC) 140. The nUE 110 and one or more of the wUEs 120 mutually authenticate to form a personal area network (PAN).

Air interfaces between the entities include an S1 interface 145 between the EPC 140 and the eNB 130; a Uu-p interface 150 between the nUE 110 and the eNB 130; a (higher power-demand) Uu-w interface 160a between the wUE 120a and the eNB 130 (similar Uu-w interfaces are not shown for the wUE 120b and the wUE 120c); Xu-a interfaces 170 between the nUE 110 and the wUE 120a and the wUE 120b; and an Xu-b interface 180 between the wUE 120b and the wUE 120c (other Xu-b interfaces are not shown). In general, the Xu-a interfaces provide intra-PAN air interfaces between an nUE and associated wUEs, and the Xu-b interfaces provide intra-PAN air interfaces among wUEs, but design principles described herein may apply to either of the Xu-a or Xu-b interfaces (generally referred to as Xu interfaces).

The described Xu interfaces and associated L1 procedures are designed for energy-efficient operation and to meet other performance specifications and characteristics of ultra-dense deployments. For example, with respected to the Xu-a and Xu-b interfaces, a typical transmission power may be of 0 dBm or less, and the power consumption of the baseband modem constitutes a primary portion of total power consumption. To provide for power-efficient baseband operation and other design considerations, the following aspects are contemplated in the design of the Xu interfaces and L1 procedures: low baseband computation complexity; a baseband or core processor that is placed in an idle state as much as possible; ultra-dense deployment scenarios; uplink (UL) and downlink (DL) resource acquisition and utilization fairness among various UEs; and scalability from small to large networks.

Based on the aforementioned design considerations, this disclosure describes frame structures and L1 procedures suitable for the Xu interface(s). Some features of the design are summarized as follows.

The design features a common synchronization source for nUEs and wUEs within one synchronized cluster (also called a synchronization cluster). A synchronization cluster may have multiple PANs. For example, a wUE may be in range of a first nUE but out of range of a second nUE, but the nUEs are still synchronized because they can hear each other's broadcast channel. Accordingly, all the nUEs and wUEs within a cluster are synchronized through a common synchronization channel. In other words, all the nUEs are broadcasting the same synchronization signal (SS), which may comprise a sequence. And, in some embodiments deployed within a base station coverage region, the base station optionally maintains synchronization by providing, for example, primary/secondary synchronization signals (PSS/SSS). Because there is a common synchronization, the design may maintain a radio frame boundary aligned among the PANs for reduced collision avoidance.

The design can be operated in both licensed and unlicensed bands. For example, in the licensed band resources may be allocated by a base station or the PAN may share resources with a licensed system. In the unlicensed band, the PAN may share resources with an unlicensed system.

The design affords support of various system bandwidth values comprising a flexible number of subchannels.

The design also allows for dynamic configuration of a DL/UL ratio of subframes in a time-division duplex (TDD) radio frame. Accordingly, the nUE configures the DL/UL operation of each PAN by providing an indication to the wUEs through a physical control channel. The physical control channels are channels in the first two or three symbols of each subframe. For example, a scheduling assignment (SA) channel and an SA response (SAR) channel (e.g., FIG. 5) are physical control channels.

The design includes a self-contained frame structure. In other words, data is transmitted in one portion of a subframe and feedback, such as an acknowledgement (ACK) or negative ACK (NACK), is provided during another portion of the same subframe. Thus, each subframe is self-contained because it encompasses both communication (e.g., downlink) and feedback (e.g., uplink) periods at different times in the subframe. Also, although each subframe includes uplink and downlink periods, the subframes are referred to as UL or DL subframes because DL subframes include physical resources for transmission of DL data from an nUE to a wUE and UL subframes include physical resources for transmission of UL data from a wUE to an nUE.

The design includes contention-based inter-PAN resource coordination for scalability. Resource allocation of each PAN is done by handshaking—i.e., no central resource allocation is used in some embodiments. Also, under the contention-based embodiments, there is an automatic back-off timer for obtaining resources after collision in, for example, an ultra-dense deployment scenario.

Another aspect of the design includes allowing a base station to coordinate the resource allocation when the nUE or its associated PAN overlaps with coverage of the base station. In other words, the base station can help assign resources to one or more PANs. And the resources allocated to each PAN might be selected by the base station to avoid collisions.

The design considers autonomous fairness control in which an nUE performs smart scheduling by allowing each wUE some access to the resources.

In a dense scenario, there is an increased likelihood of collision between wUEs requesting resources. Accordingly, the design includes a backoff procedure for reducing subsequent collisions.

The design considers a rapid transition between active and idle/power saving states for power savings.

The proposed protocol can be generally applied in mobile cell scenarios including personal area network, home area network, vehicle-to-vehicle (V2V), mobile relay, or other scenarios.

Identifiers

Initially, the following Table 1 includes a list of identifiers (IDs) and describes the associated information provided by these IDs, such as media access control (MAC) addresses. These IDs are referred to in subsequent tables and paragraphs of this disclosure.

TABLE 1

| IDs | Description or Function |
| --- | --- |
| nUE MAC address | Unique address for nUE |
| wUE MAC address | Unique address for wUE |
| nUE temporary short ID (also called a short ID) | This ID is generated from nUE MAC address and is used to identify the nUE during intra-PAN communication |
| wUE temporary short ID (also called a short ID) | This ID is generated from wUE MAC address and is used to identify the wUE during intra-PAN communication |
| Discovery ID | A pool of discovery IDs is defined. These are used for broadcasting discovery content messages. |
| Random Access (RA)-ID | This ID is generated from nUE short ID and is used by wUE during random access to the nUE |

States of Operation

Figure 2:
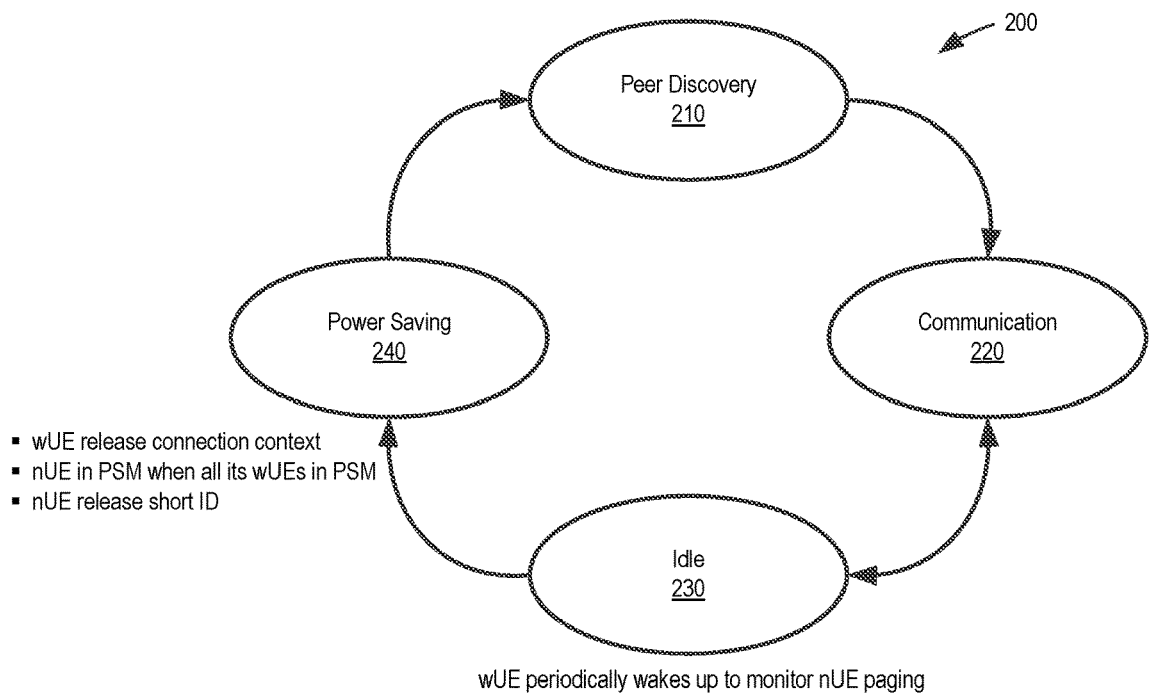
FIG. 2 is a state transition diagram showing operational states and state transitions of a wUE and an nUE sharing an Xu interface.

FIG. 2 describes four operation states 200 and the transition between the states described as follows.

In a peer discovery state 210, an nUE (e.g., the nUE 110) and an accessible wUE (e.g., the wUE 120a) send discovery signals to be mutually discovered. The discovery procedure is described later with reference to FIG. 12.

In a communication state 220, there is active (on-going) time-division duplex (TDD) traffic exchanged between the nUE and the wUE.

In an idle state 230, the wUE does not have an active exchange of traffic, but the context of the connection between the nUE and the wUE is still maintained at the wUE. The wUE periodically wakes up to monitor paging.

In a power saving state 240, the wUE releases the context of the connection between the wUE and the nUE. The nUE may then enter a power-saving mode (PSM) after all of its associated wUEs are in the PSM. Once in PSM, the nUE and wUE may re-establish the connection via peer discovery.

Frame Structure

Figure 3:
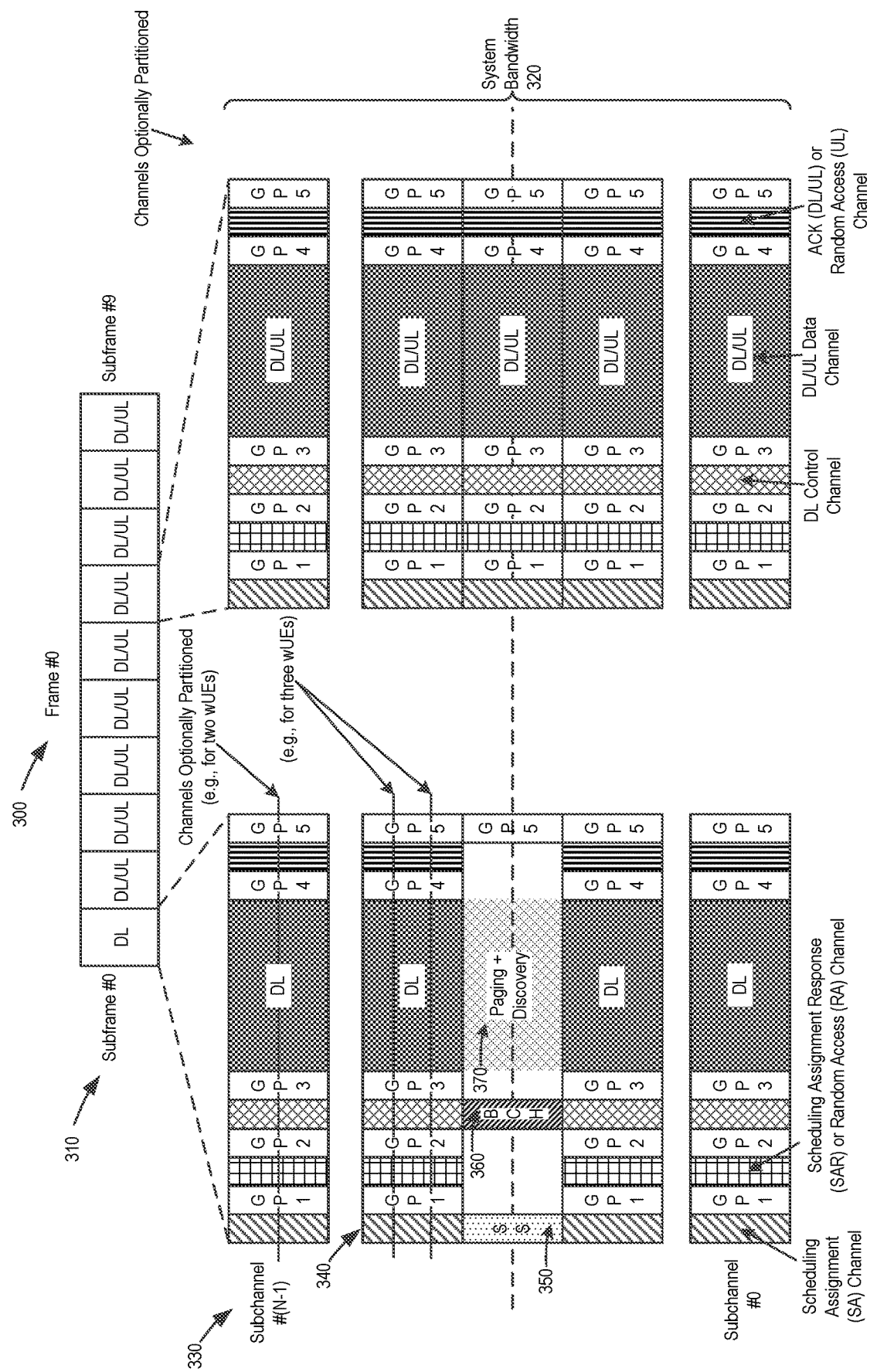
FIG. 3 is a block diagram showing a radio-frame, subframe, and subchannel structure for uplink (UL) and downlink (DL) communications through an Xu-a air interface.

FIG. 3 is a hierarchical depiction of radio frame structure 300, a TDD-based subframe structure 310 of the radio frame 300, a system bandwidth 320 allocated in subchannels 330, and TDD-based channels 340 allocated in the subchannels 330.

The radio frame 300 shows 10 subframes, but the number of subframes within each frame can be greater or less than 10. Among the subframes within each frame, at least one subframe is preconfigured as a DL subframe. FIG. 3, for example, shows subframe #0 is allocated as the DL subframe, though other allocations are possible. Other subframes can be flexibly configured as DL or UL subframes, which is indicated in FIG. 3 by the "DL/UL" notation. As an aside, DL refers to a transmission direction from nUE to wUE, and UL refers to a transmission direction from wUE to nUE. The DL and UL transmission can be dynamically scheduled in each PAN. In each subframe, some of the PANs can transmit in their acquired resource allocations in the UL direction while some of the PANs can transmit in their acquired resource allocations in the DL direction.

The smallest unit of physical resources available in the frame is referred to as a resource element (RE) of one symbol and one subcarrier. A block (in time and frequency)

of adjacent REs form a physical resource block (PRB). Two temporally adjacent PRBs are referred to as a pair of PRBs. In some embodiments, a subchannel has a subchannel bandwidth corresponding to multiple pairs of PRBs. The subchannel bandwidth is then partitioned according to a physical resource assignment (PRA) allocated for communications between an nUE and an associated wUE. One example of resources available in a frame structure is set forth in Table 2.

TABLE 2

| Name | Size |
| --- | --- |
| RE | 1 subcarrier × 1 symbol |
| PRB | 84 REs = |
|  | 12 subcarriers × 7 symbols |
| Subchannel | 6 pairs of PRBs = |
|  | (6 × 12 subcarriers) × (2 × 7 symbols) |
| PRA | Aggregation levels: 1 PRB, 2 PRB, 3 PRB, or 6 PRB |

Each nUE determines an aggregation level of the PRA. The aggregation level of the PRA of each nUE is consistent throughout one subframe. An associated wUE needs to do blind detection on one subchannel to try different aggregation levels. In general, blind detection is used when multiple UEs in a coverage region share a common resource. Accordingly, each UE blindly detects in that resource its own control or data information, e.g., decoding all of the information to obtain the information meant for the particular wUE. After detecting the aggregation level, the wUE can employ the same PRA aggregation level for detecting the other channels.

Figure 9:
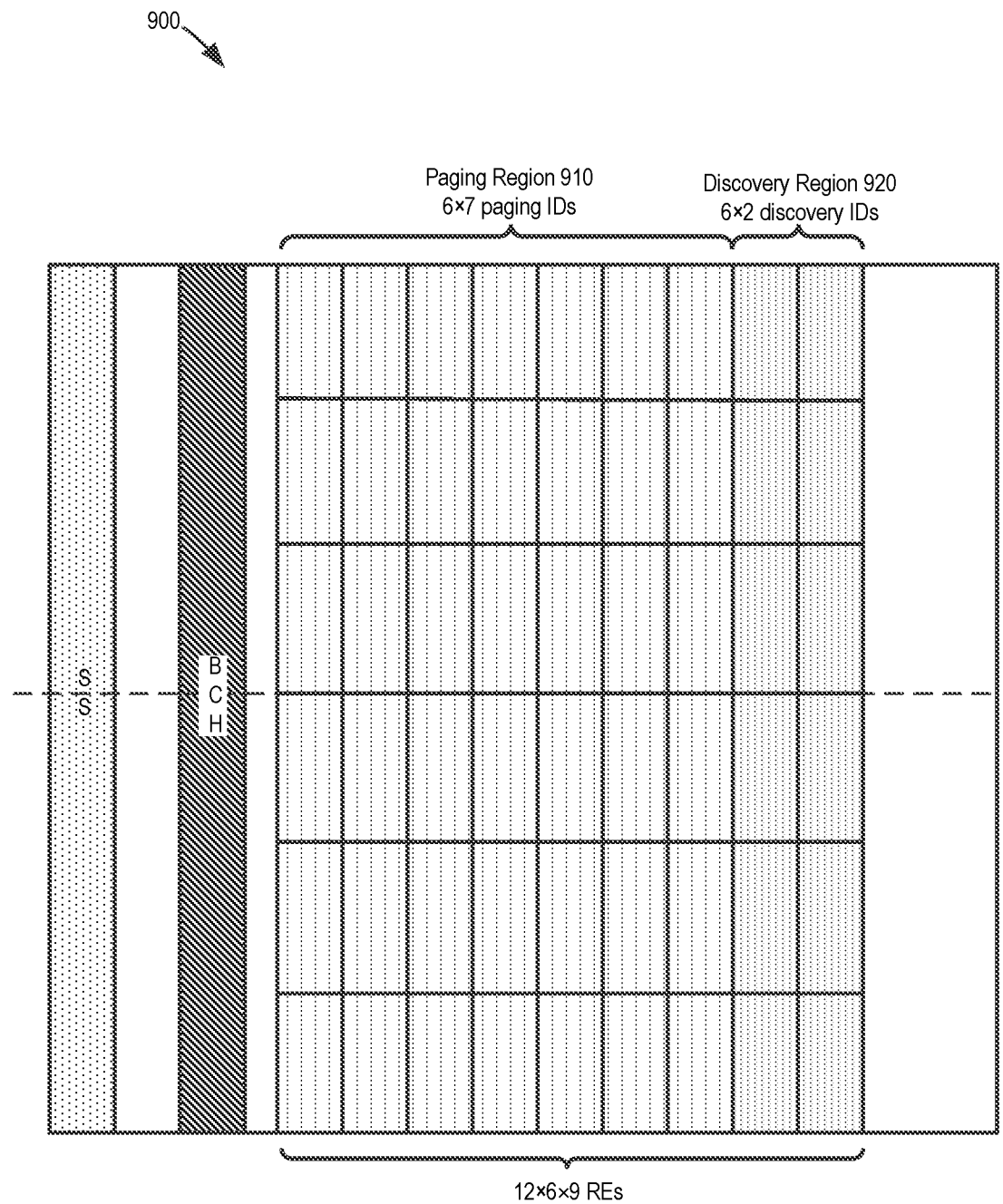
FIG. 9 is a block diagram of paging and discovery region allocation in a subchannel.

FIG. 3 shows a centrally located subchannel used for an SS 350, a broadcast channel (BCH) 360, and a paging and discovery channel 370 shown in greater detail in FIG. 9. Other subchannels show an example of a subframe structure having an internal TDD channel allocation—defined by multiple guard periods (GPs)—shown in greater detail in FIG. 6, but any of the following options described with reference to FIGS. 4-7 (or combinations thereof) could be used for the TDD resource allocation shown in FIG. 3.

Figure 4:
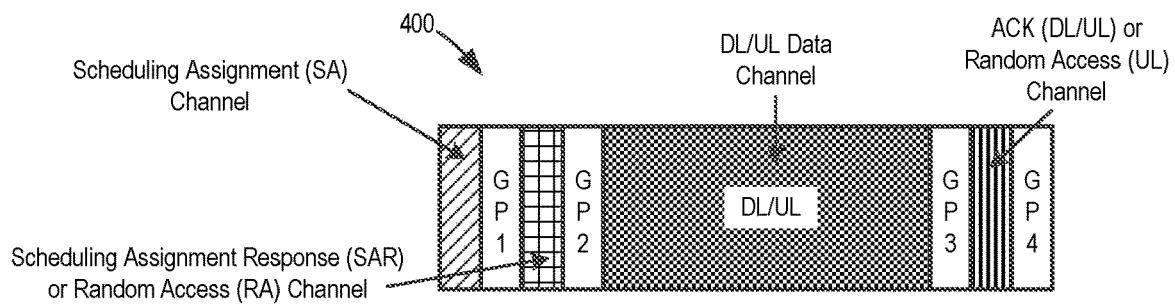
FIG. 4 is a block diagram of a subframe structure, according to a (first) option A embodiment.

FIG. 4 shows an annotated subframe structure 400 referred to as option A. Descriptions of the physical channels in the subframe structure 400 are set forth in Table 3. The contents of the physical channels and the number of bits carried therein are listed as examples. Also, guard period (GP) 2 is optional when UL traffic is scheduled in the data channel.

TABLE 3

| Channel | Content |
| --- | --- |
| Scheduling Assignment (SA) (i.e., DL) | DL/UL indication (1 bit) + nUE Tx power per RE in the PRA (6 bits) + DL modulation coding scheme (MCS) (4 bits) + cyclic redundancy check (CRC) (5 bits) Scrambled by wUE short ID (e.g., using an XOR operation) |
| SA Response (SAR) (i.e., UL) | DL: DL MCS (4 bits) + DL power headroom (PHR) (5 bits) + CRC (5 bits) UL: UL MCS (4 bits) + DL PHR (5 bits) + CRC (5 bits) Scrambled by wUE short ID |
| RA (i.e., UL) | Option 1: buffer status report (BSR) (5 bits) + wUE short ID (9 bits) + CRC (5 bits) (no information bit-level scramble) Option 2: BSR (5 bits) + CRC (5 bits) |

TABLE 3-continued

| Channel | Content |
| --- | --- |
|  | (scrambled by wUE short ID), nUE may try all the wUE short IDs |
| Data (i.e., DL/UL) |  |
| ACK/NACK (i.e., DL/UL) | wUE feedback: ACK/NACK (4 bits) (repetition) + BSR (5 bits) + CRC (5 bits) nUE feedback: ACK/NACK (9 bits) (repetition) + CRC (5 bits) Scrambled by wUE short ID |

Option A has less overhead because it has two control channels instead of three or more. In case of traffic depending on low latency transmission, the transmission power of the SA and SAR channels can be boosted so that the traffic can have a higher chance of getting the channel and can be more reliably delivered.

Figure 5:
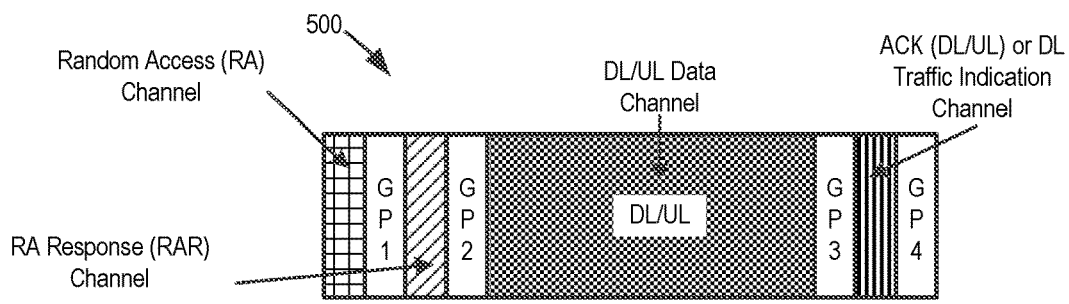
FIG. 5 is a block diagram of a subframe structure, according to a (second) option B embodiment.

FIG. 5 shows an annotated subframe structure 500 referred to as option B. Descriptions of the physical channels in the subframe structure 500 are set forth in Table 4. The contents of the physical channels and the number of bits carried are listed as examples. GP 2 is optional when DL traffic is scheduled in the data channel.

TABLE 4

| Channel | Content |
| --- | --- |
| RA (i.e., UL) | wUE Tx power per RE (6 bits) + wUE short ID (9 bits) + CRC (5 bits) Not scrambled in information bits level |
| RA Response (RAR) (i.e., DL) | DL/UL indication (1 bit) + MCS (4 bits) + UL PHR (5 bits) + CRC (5 bits) If no corresponding RA, UL PHR is all zero Scrambled by wUE short ID |
| ACK/NACK (i.e., DL/UL) and DL Traffic Indicator | wUE feedback: ACK/NACK (4 bits) (repetition) + BSR (5 bits) + CRC (5 bits) nUW feedback: ACK/NACK (9 bits) (repetition) + CRC (5 bits) Scrambled by wUE short ID |
| Data (i.e., DL/UL) |  |

Option B operation is wUE centric because the wUE initiates resource acquisition. This option does not use blind detection at the wUE, and it also has less overhead because there are fewer control channels. In case of traffic depending on low latency transmission, the transmission power of the RA and RAR channels can be boosted so that the traffic can have a higher chance of getting the channel and can be more reliably delivered.

Figure 6:
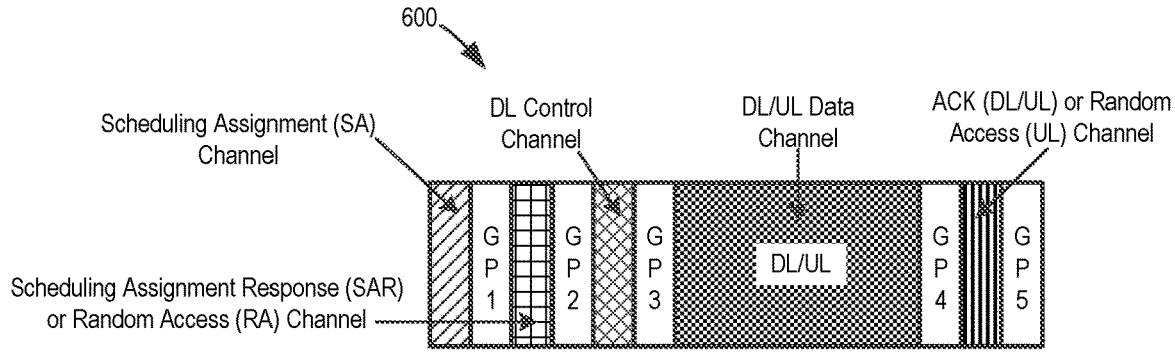
FIG. 6 is a block diagram of a subframe structure, according to a (third) option C embodiment.

FIG. 6 shows an annotated subframe structure 600 referred to as option C. Descriptions of the physical channels in the subframe structure 600 are set forth in Table 5. The contents of the physical channels and the number of bits carried are listed as examples. GP 3 is optional when DL traffic is scheduled in the data channel.

TABLE 5

| Channel | Content |
| --- | --- |
| SA (i.e., DL) | wUE short ID (9 bits) + CRC (5 bits) |
| SAR (i.e., UL) | DL PHR (4 bits) + CRC (5 bits) Scrambled by wUE short ID |
| DL Control | DL/UL indication (1 bit) + MCS (4 bits) + UL PHR (4 bits) + CRC (5 bits) |
| RA (i.e., UL) | Option 1: BSR (5 bits) + wUE short ID (9 bits) + CRC (5 bits) (no information bit level scramble) |

TABLE 5-continued

| Channel | Content |
|---|---|
| | Option 2: BSR (5 bits) + CRC (5 bits) (scrambled by wUE short ID), nUE try all wUE short ID |
| Data (i.e., DL/UL) | |
| ACK/NACK (i.e., DL/UL) | wUE feedback: ACK/NACK (4 bits) (repetition) + BSR (5 bits) + CRC (5 bits)<br>nUW feedback: ACK/NACK (9 bits) (repetition) + CRC (5 bits)<br>Scrambled by wUE short ID |

Option C can provide more accurate scheduling and less likelihood of collision, and is more robust to hidden node problems. However, the overhead is higher due to an increased number of control channels. There is also some blind detection performed at the wUE.

In case of traffic depending on low latency transmission, the transmission power of the SA, SAR, and DL control channels can be boosted so that the traffic can have a higher chance of getting the channel and can be more reliably delivered.

Figure 7:
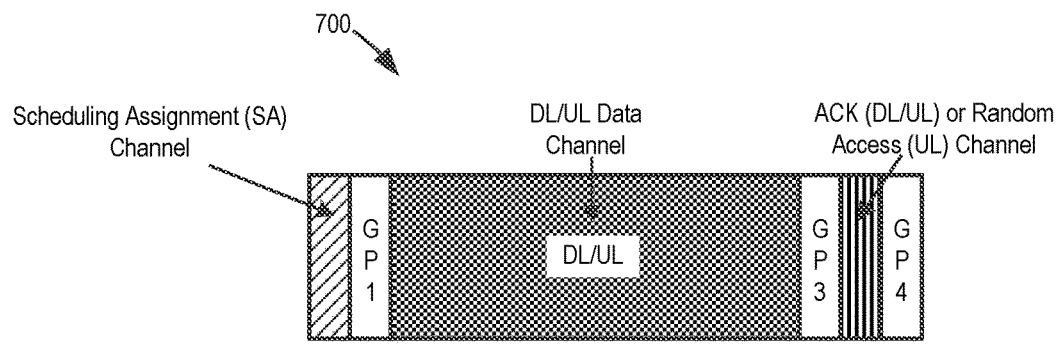
FIG. 7 is a block diagram of a subframe structure, according to a (fourth) option D embodiment.

FIG. 7 shows an annotated subframe structure 700 referred to as option D. Descriptions of the physical channels in the subframe structure 700 are set forth in Table 6. The contents of the physical channels and the number of bits carried are listed as examples. GP 1 is optional when DL traffic is scheduled in the data channel.

TABLE 6

| Channel | Contents |
|---|---|
| SA channel (i.e., DL) | DL/UL indication (1 bit) + MCS (4 bits) + nUE Tx power per RE in the PRA (6 bits) + UL PHR (4 bits) + CRC (5 bits)<br>Scrambled by wUE short ID |
| RA (i.e., UL) | Option 1: BSR (5 bits) + 9 bits wUE short mac id + CRC (5 bits) (no information bit level scramble)<br>Option 2: BSR (5 bits) + CRC (5 bits) (scrambled by wUE short ID), nUE try all wUE short ID |
| Data (i.e., DL/UL) | |

TABLE 6-continued

| Channel | Contents |
|---|---|
| ACK/NACK (i.e., DL/UL) | wUE feedback: indication of either ACK response to SA, or to both SA and data channels (1 bit) + ACK/NACK (4 bits) (repetition) + BSR (5 bits) + DL PHR (4 bits) + CRC (5 bits)<br>nUW feedback: ACK/NACK (10 bits) (repetition) + UL PHR + CRC (5 bits)<br>Scrambled by wUE short ID |

Option D will have less control and guard period overhead. However, this option does not have a handshake procedure for collision avoidance. The nUE will transmit DL traffic even if a collision happens. For traffic in the DL, after transmitting SA, the nUE will transmit DL data. The wUE feeds back ACK to indicate reception of SA and data. A separate ACK for indication of reception of SA is needed so that the reception error due to a collision and a data channel decoding error can be differentiated and consequently treated differently. For traffic in the UL, if the wUE fails to detect the SA, it will not transmit in the UL and the nUE will know the occurrence of a collision given no ACK feedback from the wUE.

In case of traffic depending on low latency transmission, the transmission power of the SA channel can be boosted so that the traffic can have a higher chance of getting the channel and can be more reliably delivered.

Numerology

Example numerologies are shown in Table 7. Option 1 follows conventional LTE subcarrier spacing. Options 2 and 3 have increased subcarrier spacing. To support the same maximum system bandwidth (e.g., 20 MHz), the fast Fourier transform (FFT) size of options 2 and 3 can be smaller and can reduce the implementation complexity. On the other hand, give the same number of subcarriers in the minimum system bandwidth, the minimum system bandwidth of options 2 and 3 would be larger than that of option 1. This could impact the SS design. Moreover, when using short subframe length in options 2 and 3, the physical (PHY) layer overhead (i.e., GP, scheduling assignment, control, feedback) could be high.

TABLE 7

| Numerology | Option 1 | Option 2 | Option 3 |
|---|---|---|---|
| Subcarrier Spacing | 15 kHz | 60 kHz | 75 kHz |
| Sampling rate (1/Ts) | 30.72 MHz<br>(20 MHz, 2048-FFT)<br>1.92 MHz<br>(1.4 MHz, 128-FFT) | 30.72 MHz<br>(20 MHz, 512-FFT)<br>7.68 MHz<br>(5 MHz, 128-FFT) | 38.4 MHz<br>(20 MHz, 512-FFT)<br>9.6 MHz<br>(6 MHz, 128-FFT)<br>4.8 MHz<br>(2 MHz, 64-FFT) |
| Number of Subcarriers | 1200<br>72 | 320<br>72 | 240<br>72<br>24 |
| Cyclic Prefix (CP) Length | 16Ts = 0.5208 µs | 16Ts = 0.5208 µs | 20Ts = 0.5208 µs |
| Symbol Length | (2048 + 16)Ts = 67.18 µs | (512 + 16)Ts = 17.18 µs | (512 + 20)Ts = 14.27 µs |
| Number of Symbols/Subframe | 14 | 14<br>28<br>56 | 14<br>35<br>70 |
| Subframe Length | 1 ms | 0.25 ms<br>0.5 ms<br>1 ms | 0.2 ms<br>0.5 ms<br>1 ms |

TABLE 7-continued

| Numerology | Option 1 | Option 2 | Option 3 |
|---|---|---|---|
| Frame Length | 10 ms | 2.5 ms<br>5 ms<br>10 ms | 2 ms<br>5 ms<br>10 ms |

L1 Procedure

Figure 8:
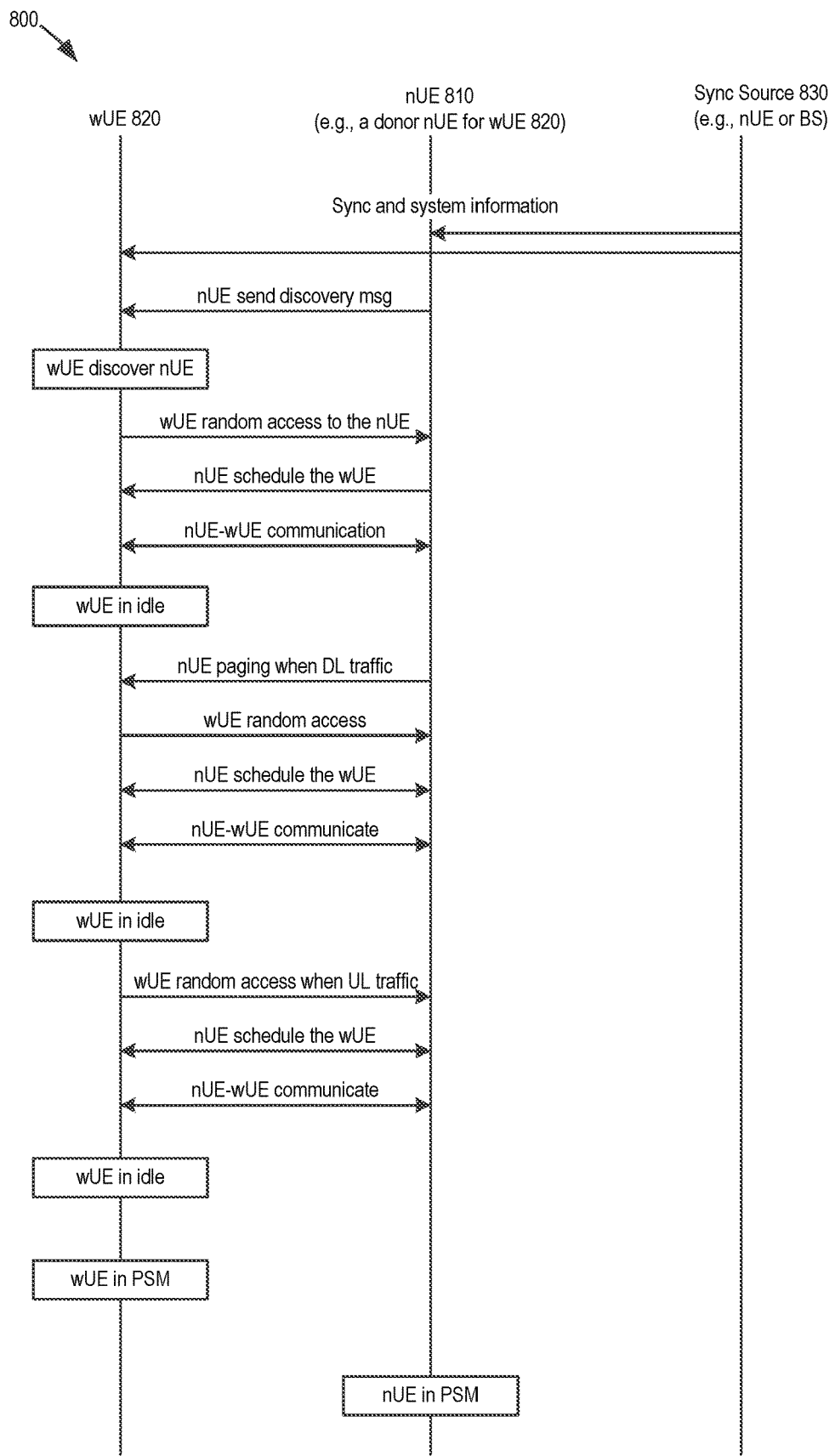
FIG. 8 is a sequence diagram of an L1 procedure.

FIG. 8 shows an L1 procedure 800. An nUE 810 and a wUE 820 monitor the SS and system broadcasting signal from a synchronization source 830 (which may be a nearby nUE or a base station). If the nUE 810 or the wUE 820 cannot detect a synchronization signal, then the nUE 810 itself may become a synchronization source (the wUE 820 typically would not be a sync source unless it is triggered by users, i.e., when they seek to pair with another wUE).

Figure 10:
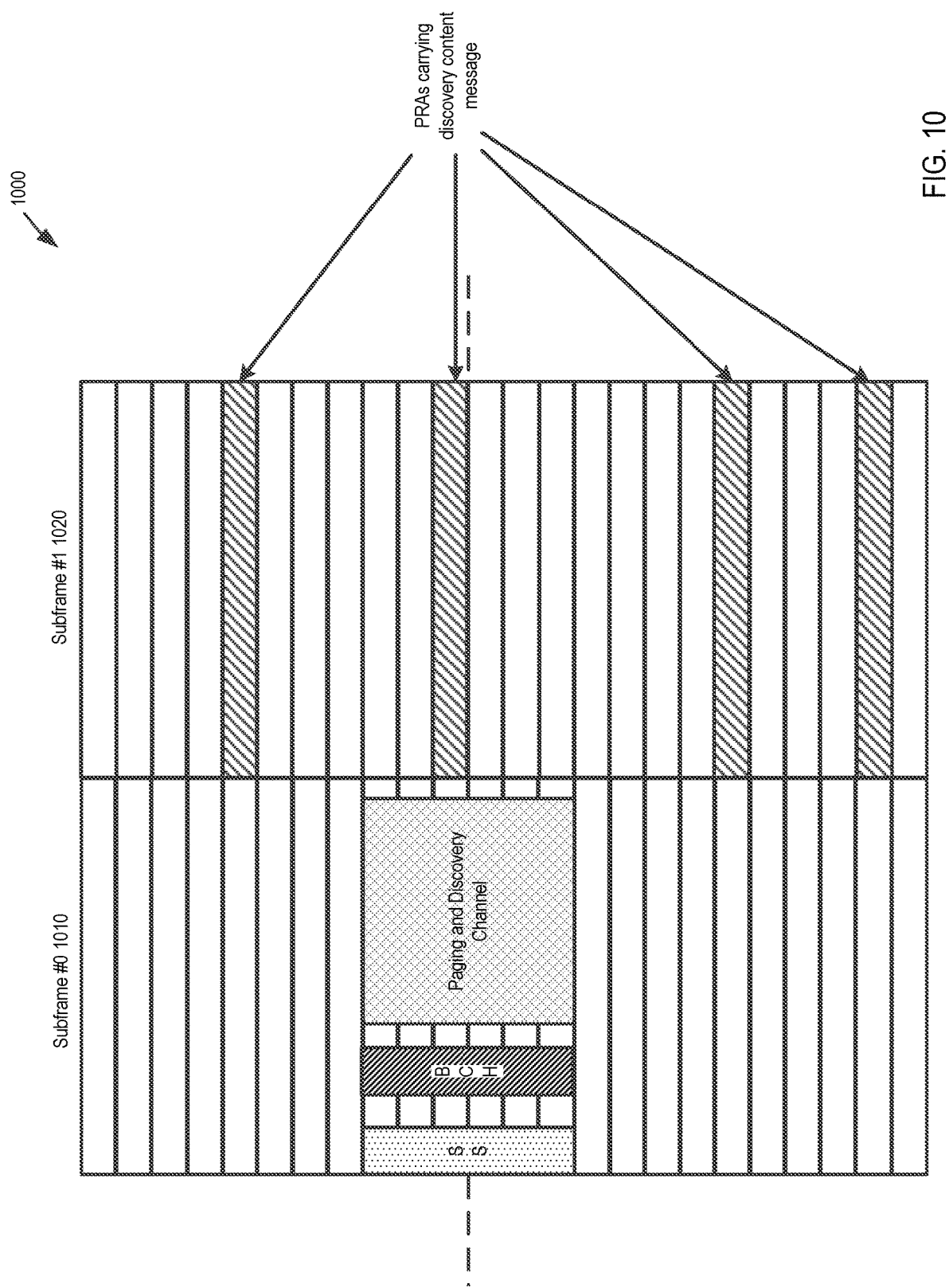
FIG. 10 is a block diagram showing discovery content message transmission.
Figure 11:
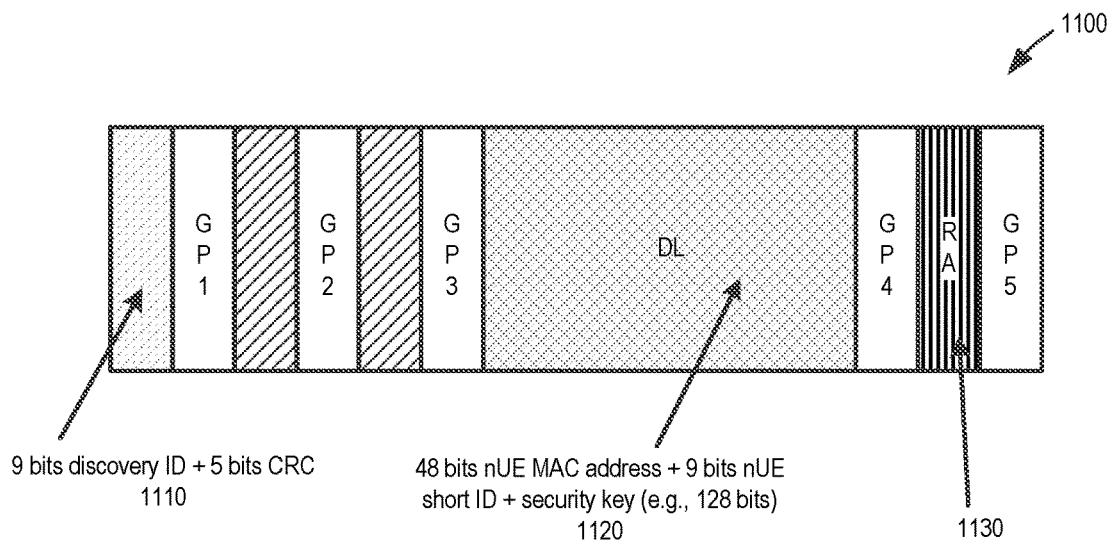
FIG. 11 is a block diagram showing a discovery content message broadcasting subframe.

After detecting synchronization and system information, the wUE 820 then discovers the nUE 810 via a discovery procedure (see, e.g., FIG. 12) including detecting a discovery ID message (see, e.g., FIG. 9) and receiving a discovery content message (see, e.g., FIGS. 10 and 11).

After discovering the desired nUE 810, the wUE 820 performs a random access procedure to obtain resources from the nUE 810. Upon successful detection of the random access signal from the wUE 820, and when certain conditions are met (i.e., authentication and security and the load of the nUE 810 is not exceeded), the nUE 810 admits the wUE 820 and schedules communications.

In cases where the wUE 820 does not have traffic for a certain period, the wUE 820 may enter into an idle mode (described previously) in which the wUE 820 maintains system timing and periodically monitors paging.

When paged, the wUE 820 again performs a random access to the (donor) nUE 810 and re-establishes communication with it. When the wUE 820 has uplink traffic, the wUE 820 performs random access to obtain resources from the (donor) nUE 810 and moves from idle mode to connected mode.

Paging and Discovery Procedure

FIG. 9 shows an example resource allocation 900 for paging and discovery regions. According to one embodiment, the paging and discovery channel uses a central subchannel that has a bandwidth of six PRBs (6×12 subcarriers) and a subframe duration equal to that of a temporally adjacent pair of PRBs (2×7 symbols). In that subchannel and, for example, in the first subframe of each radio frame, the paging and discovery channel includes a paging region 910 and a discovery region 920 encompassing the subchannel bandwidth and nine of the symbols. The paging region 910 includes seven symbols and the discovery region 920 includes two symbols. Paging and discovery ID messages are provided in blocks of size 1×12 REs, assigned for each of the paging and discovery ID messages.

The paging ID message carries the paging ID. According to one embodiment, the paging ID is a short ID of the targeted wUE. The targeted wUE, if in its idle state, receives the paging ID message and wakes up to receive and transmit information in subsequent subframes.

The discovery ID message carries a discovery ID. According to one embodiment, a pool of discovery IDs is predefined for an entire system, and the nUE picks one discovery ID from the discovery ID pool. In another embodiment, the nUE may simply use its own short ID. The discovery IDs are broadcast IDs that are addressable to all wUEs.

FIG. 10 shows a pair of subframes 1000 that an nUE uses to transmit discovery ID and content messages. In other words, a first subframe is used for transmitting the discovery ID message and a subsequent subframe is used to transmit the discovery content message. For example, when a wUE detects in the paging and discovery channel of a first subframe 1010 a discovery ID corresponding to, for example, the MAC address of an accessible nUE, the wUE can use the detected discovery ID to decode the discovery content message transmitted in a second subframe 1020. The wUE identifies a subchannel and a PRA carrying the discovery content message based on a defined map translating the discovery ID to the corresponding resources carrying the discovery content message. To reduce wUE power consumption, a mapping between MAC addresses and the discovery ID pool may be predefined for the system or by an nUE.

FIG. 11 shows an example subframe structure 1100 carrying a discovery content message. An SA channel includes the discovery ID used to indicate that the nUE is acquiring subsequent resources in the subframe by which to deliver discovery content. When a wUE detects the discovery ID in an SA channel (e.g., based on the aforementioned mapping of the discovery ID to the SA channel), the wUE reads the discovery content transmitted in a DL data channel 1120. The discovery content includes the nUE's MAC address, the nUE's short ID, and a security key. An RA channel 1130 allows the wUE to then acquire resources.

Figure 12:
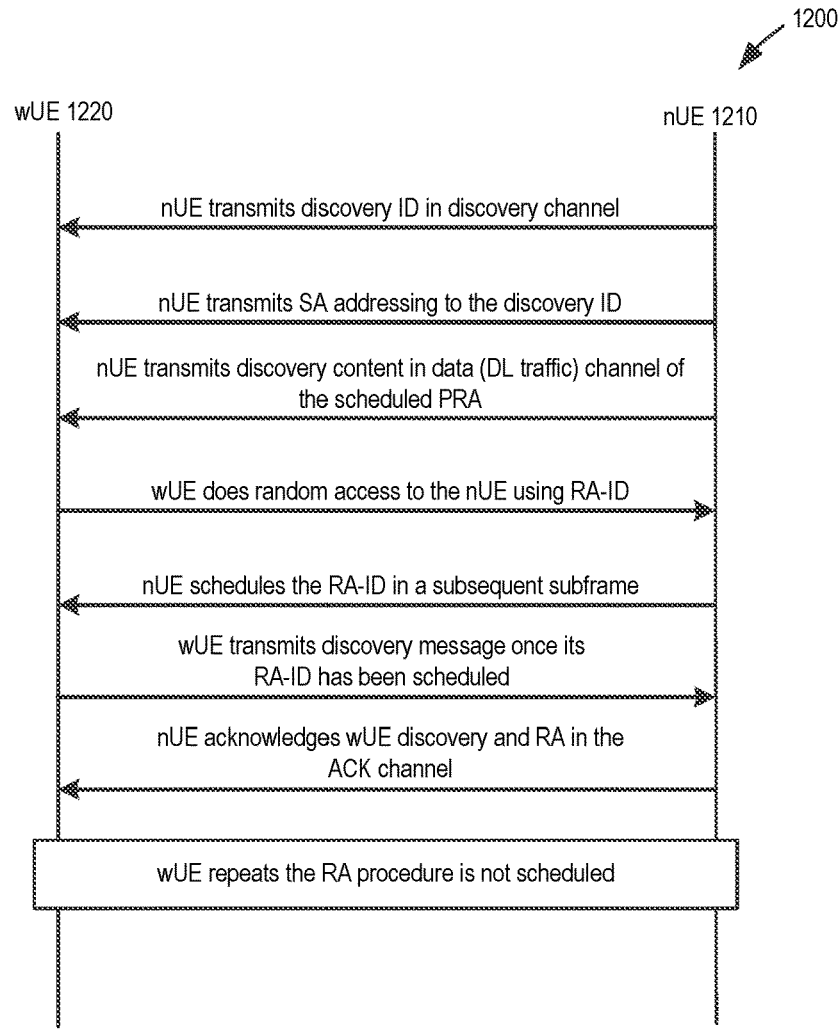
FIG. 12 is a sequence diagram of a discovery procedure.

FIG. 12 shows a discovery procedure 1200. Initially, an nUE 1210 transmits a discovery ID in the discovery channel (e.g., region 920, FIG. 9). The nUE 1210 then transmits an SA in the SA channel (e.g., 1110, FIG. 11) addressed to the discovery ID. The nUE 1210 transmits discovery content (MAC ID+nUE short ID+security key) in the following DL data channel (e.g., 1120, FIG. 11).

A wUE 1220 responds with an RA in the RA channel (e.g., 1130, FIG. 11) once it has detected the desired nUE from the discovery content. The RA message carries an RA-ID derived from the nUE short ID.

Once the nUE 1210 detects the wUE RA-ID, the nUE 1210 schedules the wUE 1220 by transmitting an SA addressed to the RA-ID in the subsequent subframes following the subframe that the RA is transmitted, i.e., the nUE responds to wUE's RA in the next subframe or a later subframe. According to one embodiment the subsequent subframe may include a second DL/UL subframe.

Once the wUE 1220 detects the SA from the nUE 1210, the wUE 1220 transmits its discovery content in the data channel of the scheduled PRA. The discovery content contains: wUE MAC address, wUE short ID, security key, and UL traffic indication.

The nUE 1210 provides an acknowledgement (admit or decline) to the wUE RA in the ACK channel.

If the wUE 1220 is not scheduled in the second subframe (due to transmission collision, RA-ID collision, or other constraint), the wUE 1220 will keep sending an RA in the RA channel during the following subframes, e.g., a second DL/UL subframe of subsequent radio frames.

Example Devices and Circuitry

Figure 13:
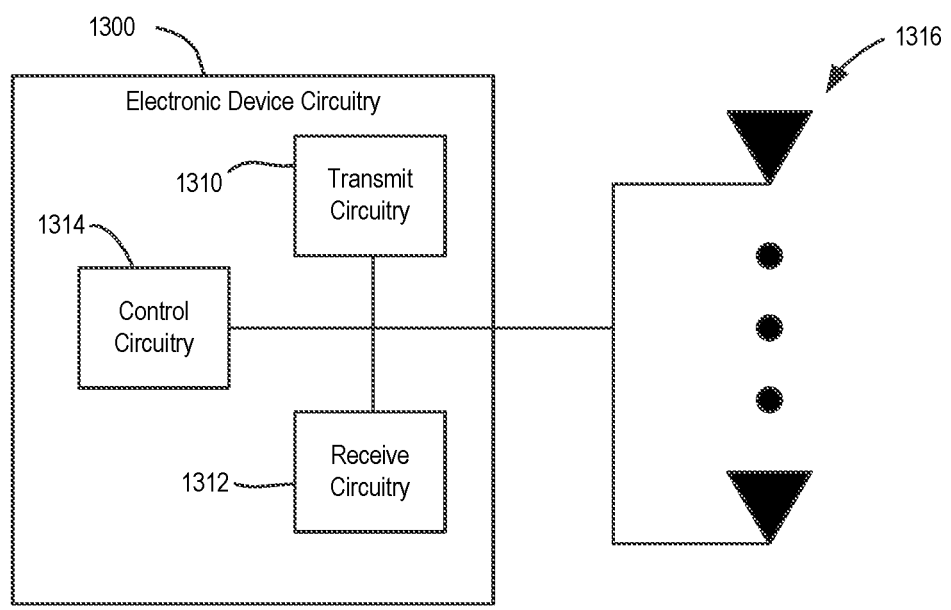
FIG. 13 is a block diagram illustrating electronic device circuitry that may be UE circuitry, evolved universal terrestrial access network (EUTRAN) Node B (evolved Node B, eNodeB, or eNB) circuitry, network node circuitry, or other types of circuitry, according to one embodiment.

FIG. 13 is a block diagram illustrating electronic device circuitry 1300 that may be eNB circuitry, UE circuitry, network node circuitry, or some other type of circuitry in accordance with various embodiments. As used herein, the term "circuitry" may refer to, be part of, or include an application specific integrated circuit (ASIC), an electronic circuit, a processor (shared, dedicated, or group), and/or memory (shared, dedicated, or group) that executes one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In embodiments, the electronic device circuitry 1300 may be, or may be incorporated into or otherwise a part of, an eNB, a UE, a network node, or some other type of electronic device. In embodiments, the electronic device circuitry 1300 may include radio transmit circuitry 1310 and receive circuitry 1312 coupled to control circuitry 1314. In embodiments, the transmit circuitry 1310 and/or receive circuitry 1312 may be elements or modules of transceiver circuitry, as shown. The electronic device circuitry 1300 may be coupled with one or more antenna elements 1316 of one or more antennas. The electronic device circuitry 1300 and/or the components of the electronic device circuitry 1300 may be configured to perform operations similar to those described elsewhere in this disclosure.

Figure 14:
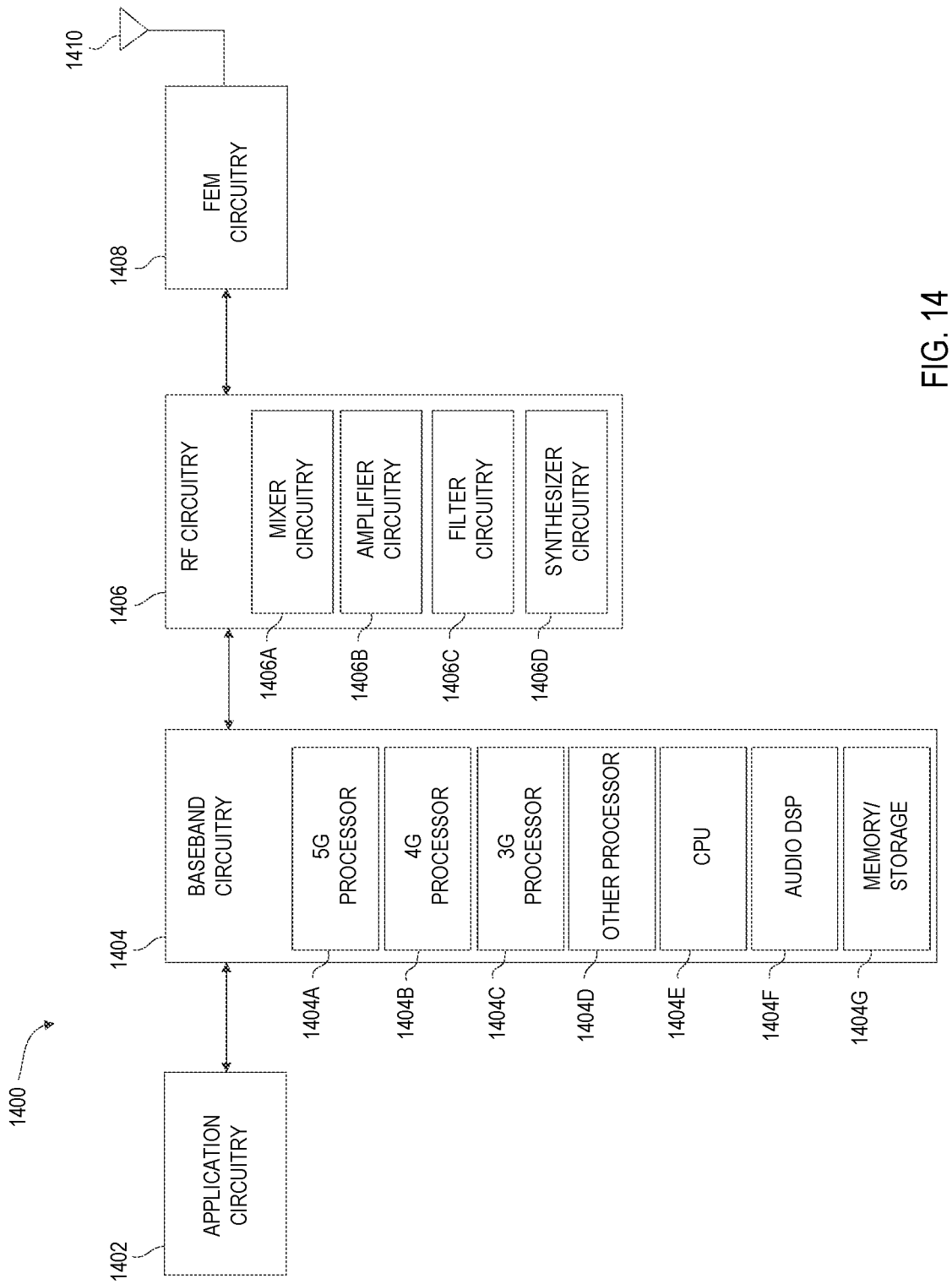
FIG. 14 is a block diagram illustrating components of a UE device according to one embodiment.

FIG. 14 is a block diagram illustrating, for one embodiment, example components of a UE device 1400. In some embodiments, the UE device 1400 may include application circuitry 1402, baseband circuitry 1404, radio frequency (RF) circuitry 1406, front-end module (FEM) circuitry 1408, and one or more antennas 1410, coupled together at least as shown in FIG. 14.

The application circuitry 1402 may include one or more application processors. By way of non-limiting example, the application circuitry 1402 may include one or more single-core or multi-core processors. The processor(s) may include any combination of general-purpose processors and dedicated processors (e.g., graphics processors, application processors, etc.). The processor(s) may be operably coupled to and/or include memory/storage, and may be configured to execute instructions stored in the memory/storage to enable various applications and/or operating systems to run on the system.

By way of non-limiting example, the baseband circuitry 1404 may include one or more single-core or multi-core processors. The baseband circuitry 1404 may include one or more baseband processors and/or control logic. The baseband circuitry 1404 may be configured to process baseband signals received from a receive signal path of the RF circuitry 1406. The baseband circuitry 1404 may also be configured to generate baseband signals for a transmit signal path of the RF circuitry 1406. The baseband circuitry 1404 may interface with the application circuitry 1402 for generation and processing of the baseband signals, and for controlling operations of the RF circuitry 1406.

By way of non-limiting example, the baseband circuitry 1404 may include at least one of a fifth generation (5G) baseband processor 1404A, a fourth generation (4G) baseband processor 1404B, a third generation (3G) baseband processor 1404C, and other baseband processor(s) 1404D for other existing generations and generations in development or to be developed in the future (e.g., sixth generation (6G), etc.). The baseband circuitry 1404 (e.g., at least one of the baseband processors 1404A-1404D) may handle various radio control functions that enable communication with one or more radio networks via the RF circuitry 1406. By way of non-limiting example, the radio control functions may include signal modulation/demodulation, encoding/decoding, radio frequency shifting, other functions, and combinations thereof. In some embodiments, modulation/demodulation circuitry of the baseband circuitry 1404 may be programmed to perform fast Fourier transform (FFT), precoding, constellation mapping/demapping functions, other functions, and combinations thereof. In some embodiments, encoding/decoding circuitry of the baseband circuitry 1404 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 1404 may include elements of a protocol stack. By way of non-limiting example, elements of an evolved universal terrestrial radio access network (EUTRAN) protocol include, for example, physical (PHY), media access control (MAC), radio link control (RLC), packet data convergence protocol (PDCP), and/or radio resource control (RRC) elements. A central processing unit (CPU) 1404E of the baseband circuitry 1404 may be programmed to run elements of the protocol stack for signaling of the PHY, MAC, RLC, PDCP, and/or RRC layers. In some embodiments, the baseband circuitry 1404 may include one or more audio digital signal processor(s) (DSP) 1404F. The audio DSP(s) 1404F may include elements for compression/decompression and echo cancellation. The audio DSP(s) 1404F may also include other suitable processing elements.

The baseband circuitry 1404 may further include memory/storage 1404G. The memory/storage 1404G may include data and/or instructions for operations performed by the processors of the baseband circuitry 1404 stored thereon. In some embodiments, the memory/storage 1404G may include any combination of suitable volatile memory and/or non-volatile memory. The memory/storage 1404G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 1404G may be shared among the various processors or dedicated to particular processors.

Components of the baseband circuitry 1404 may be suitably combined in a single chip or a single chipset, or disposed on a same circuit board in some embodiments. In some embodiments, some or all of the constituent components of the baseband circuitry 1404 and the application circuitry 1402 may be implemented together, such as, for example, on a system on a chip (SOC).

In some embodiments, the baseband circuitry 1404 may provide for communication compatible with one or more radio technologies. For example, in some embodiments, the baseband circuitry 1404 may support communication with an evolved universal terrestrial radio access network (EUTRAN) and/or other wireless metropolitan area networks (WMAN), a wireless local area network (WLAN), or a wireless personal area network (WPAN). Embodiments in which the baseband circuitry 1404 is configured to support radio communications of more than one wireless protocol may be referred to as multi-mode baseband circuitry.

The RF circuitry 1406 may enable communication with wireless networks using modulated electromagnetic radiation through a non-solid medium. In various embodiments, the RF circuitry 1406 may include switches, filters, amplifiers, etc. to facilitate the communication with the wireless network. The RF circuitry 1406 may include a receive signal path, which may include circuitry to down-convert RF signals received from the FEM circuitry 1408, and provide baseband signals to the baseband circuitry 1404. The RF circuitry 1406 may also include a transmit signal path, which may include circuitry to up-convert baseband signals provided by the baseband circuitry 1404, and provide RF output signals to the FEM circuitry 1408 for transmission.

In some embodiments, the RF circuitry 1406 may include a receive signal path and a transmit signal path. The receive signal path of the RF circuitry 1406 may include mixer circuitry 1406A, amplifier circuitry 1406B, and filter circuitry 1406C. The transmit signal path of the RF circuitry 1406 may include the filter circuitry 1406C and the mixer circuitry 1406A. The RF circuitry 1406 may further include synthesizer circuitry 1406D configured to synthesize a frequency for use by the mixer circuitry 1406A of the receive signal path and the transmit signal path. In some embodiments, the mixer circuitry 1406A of the receive signal path may be configured to down-convert RF signals received from the FEM circuitry 1408 based on the synthesized frequency provided by the synthesizer circuitry 1406D. The amplifier circuitry 1406B may be configured to amplify the down-converted signals.

The filter circuitry 1406C may include a low-pass filter (LPF) or band-pass filter (BPF) configured to remove unwanted signals from the down-converted signals to generate output baseband signals. Output baseband signals may be provided to the baseband circuitry 1404 for further processing. In some embodiments, the output baseband signals may include zero-frequency baseband signals, although this is optional, of course. In some embodiments, the mixer circuitry 1406A of the receive signal path may comprise passive mixers, although the scope of the embodiments is not limited in this respect.

In some embodiments, the mixer circuitry 1406A of the transmit signal path may be configured to up-convert input baseband signals based on the synthesized frequency provided by the synthesizer circuitry 1406D to generate RF output signals for the FEM circuitry 1408. The baseband signals may be provided by the baseband circuitry 1404 and may be filtered by the filter circuitry 1406C. The filter circuitry 1406C may include an LPF, although the scope of the embodiments is not limited in this respect.

In some embodiments, the mixer circuitry 1406A of the receive signal path and the mixer circuitry 1406A of the transmit signal path may include two or more mixers, and may be arranged for quadrature downconversion and/or upconversion, respectively. In some embodiments, the mixer circuitry 1406A of the receive signal path and the mixer circuitry 1406A of the transmit signal path may include two or more mixers and may be arranged for image rejection (e.g., Hartley image rejection). In some embodiments, the mixer circuitry 1406A of the receive signal path and the mixer circuitry 1406A of the transmit signal path may be arranged for direct downconversion and/or direct upconversion, respectively. In some embodiments, the mixer circuitry 1406A of the receive signal path and the mixer circuitry 1406A of the transmit signal path may be configured for super-heterodyne operation.

In some embodiments, the output baseband signals and the input baseband signals may be analog baseband signals, although the scope of the embodiments is not limited in this respect. In other embodiments, the output baseband signals and the input baseband signals may be digital baseband signals. In such embodiments, the RF circuitry 1406 may include analog-to-digital converter (ADC) and digital-to-analog converter (DAC) circuitry, and the baseband circuitry 1404 may include a digital baseband interface to communicate with the RF circuitry 1406.

In some dual-mode embodiments, separate radio integrated circuit (IC) circuitry may be provided for processing signals for each spectrum, although the scope of the embodiments is not limited in this respect.

In some embodiments, the synthesizer circuitry 1406D may include one or more of a fractional-N synthesizer and a fractional N/N+1 synthesizer, although the scope of the embodiments is not limited in this respect, as other types of frequency synthesizers may be suitable. For example, the synthesizer circuitry 1406D may include a delta-sigma synthesizer, a frequency multiplier, a synthesizer comprising a phase-locked loop with a frequency divider, other synthesizers, and combinations thereof.

The synthesizer circuitry 1406D may be configured to synthesize an output frequency for use by the mixer circuitry 1406A of the RF circuitry 1406 based on a frequency input and a divider control input. In some embodiments, the synthesizer circuitry 1406D may be a fractional N/N+1 synthesizer.

In some embodiments, frequency input may be provided by a voltage controlled oscillator (VCO). Divider control input may be provided by either the baseband circuitry 1404 or the application circuitry 1402 depending on the desired output frequency. In some embodiments, a divider control input (e.g., N) may be determined from a look-up table based on a channel indicated by the application circuitry 1402.

The synthesizer circuitry 1406D of the RF circuitry 1406 may include a divider, a delay-locked loop (DLL), a multiplexer, and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry-out) to provide a fractional division ratio. In some example embodiments, the DLL may include a set of cascaded, tunable, delay elements; a phase detector; a charge pump; and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 1406D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 1406 may include an IQ/polar converter.

The FEM circuitry 1408 may include a receive signal path, which may include circuitry configured to operate on RF signals received from one or more antennas 1410, amplify the received signals, and provide the amplified versions of the received signals to the RF circuitry 1406 for further processing. The FEM circuitry 1408 may also include a transmit signal path, which may include circuitry configured to amplify signals for transmission provided by the RF circuitry 1406 for transmission by at least one of the antennas 1410.

In some embodiments, the FEM circuitry 1408 may include a TX/RX switch configured to switch between a transmit mode and a receive mode operation. The FEM circuitry 1408 may include a receive signal path and a transmit signal path. The receive signal path of the FEM circuitry 1408 may include a low-noise amplifier (LNA) to amplify received RF signals and provide the amplified received RF signals as an output (e.g., to the RF circuitry 1406). The transmit signal path of the FEM circuitry 1408 may include a power amplifier (PA) configured to amplify input RF signals (e.g., provided by RF circuitry 1406), and one or more filters configured to generate RF signals for subsequent transmission (e.g., by one or more of the antennas 1410).

In some embodiments, the UE device 1400 may include additional elements such as, for example, memory/storage, a display, a camera, one or more sensors, an input/output (I/O) interface, other elements, and combinations thereof.

In some embodiments, the UE device 1400 may be configured to perform one or more processes, techniques, and/or methods as described herein, or portions thereof.

In embodiments where the UE device 1400 or its electronic circuitry (e.g., circuitry 1300) is, implements, is incorporated into, or is otherwise part of an nUE, baseband circuitry 1404 may be to indicate a paging and resource allocation to a wUE (wearable UE) to enable a transition of the wUE from a first communication operation state to a second low power operation state that includes powering up radio frequency (RF) circuitry of the wUE according to an interval associated with the paging and resource allocation, and operate in a communication operation state to receive a communication on behalf of the wUE. The RF circuitry 1406 may be to transmit a signal based on the communication at a time corresponding to a next occurrence of the paging interval.

In embodiments where the UE device 1400 is, implements, is incorporated into, or is otherwise part of a wUE, baseband circuitry 1404 may be to baseband circuitry coupled to the RF circuitry, the baseband circuitry to: identify a paging and resource allocation to a wUE (wearable UE) to enable a transition of the wUE from a first communication operation state to a second low power operation state that includes powering up radio frequency (RF) circuitry of the wUE according to an interval associated with the paging and resource allocation, and operate in a communication operation state to receive a communication on behalf of the wUE. The RF circuitry 1406 may be to transmit a signal based on the communication at a time corresponding to a next occurrence of the paging interval.

In some embodiments, the UE device 1400 of FIG. 14 may be configured to perform one or more processes, techniques, and/or methods as described herein, or portions thereof. Embodiments described herein may be implemented into a system using any suitably configured hardware and/or software. In the software context, various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Figure 15:
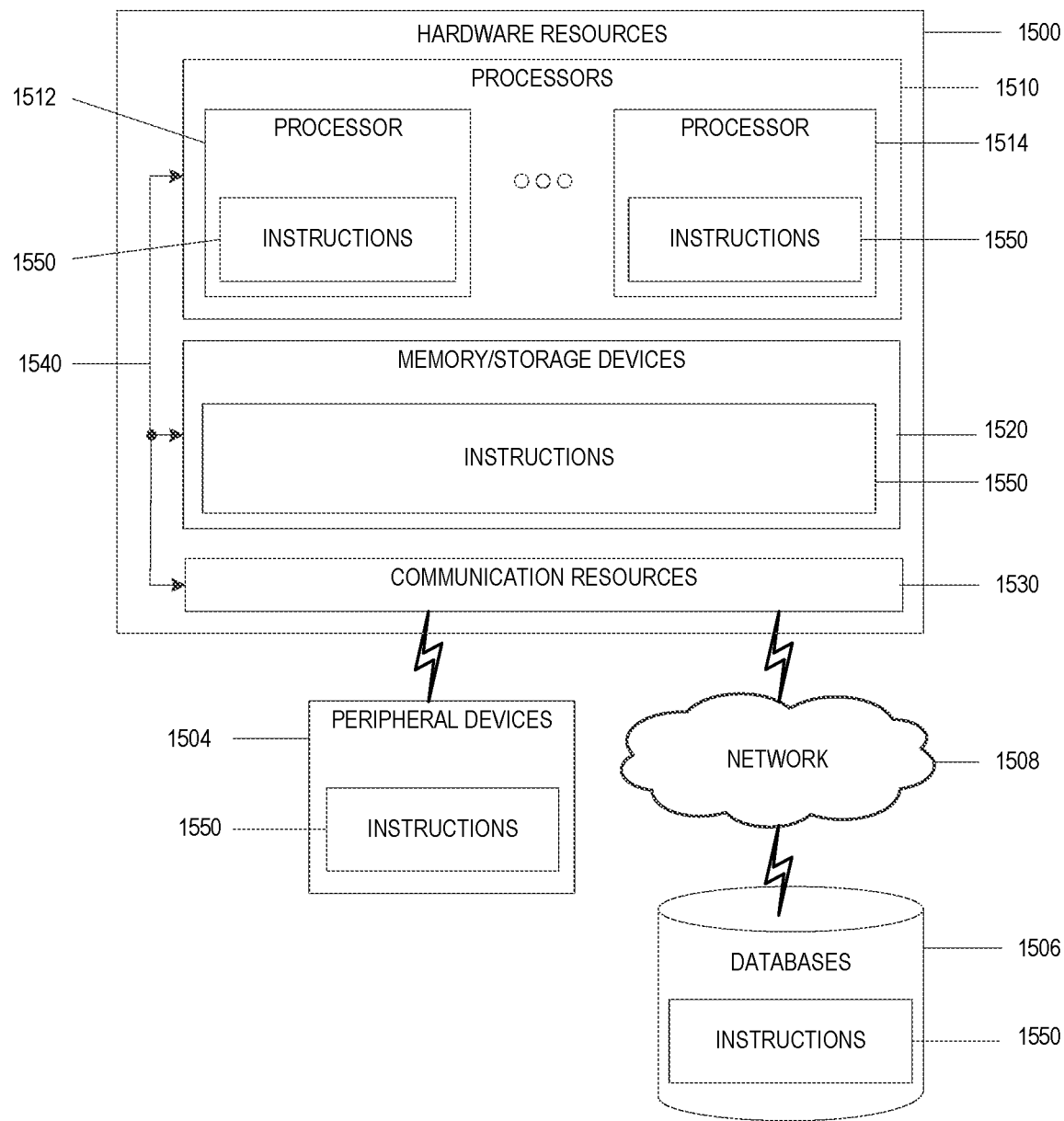
FIG. 15 is a block diagram illustrating components according to some embodiments.

FIG. 15 is a block diagram illustrating components, according to some example embodiments, able to read instructions from a machine-readable or computer-readable medium (e.g., a machine-readable storage medium) and perform any one or more of the methodologies discussed herein. Specifically, FIG. 15 shows a diagrammatic representation of hardware resources 1500 including one or more processors (or processor cores) 1510, one or more memory/storage devices 1520, and one or more communication resources 1530, each of which are communicatively coupled via a bus 1540.

The processors 1510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1512 and a processor 1514. The memory/storage devices 1520 may include main memory, disk storage, or any suitable combination thereof.

The communication resources 1530 may include interconnection and/or network interface components or other suitable devices to communicate with one or more peripheral devices 1504 and/or one or more databases 1506 via a network 1508. For example, the communication resources 1530 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1550 may comprise software, a program, an application, an applet, an app, or other executable code for causing at least one of the processors 1510 to perform any one or more of the methodologies discussed herein. The instructions 1550 may reside, completely or partially, within at least one of the processors 1510 (e.g., within the processor's cache memory), the memory/storage devices 1520, or any suitable combination thereof. Furthermore, any portion of the instructions 1550 may be transferred to the hardware resources 1500 from any combination of the peripheral devices 1504 and/or the databases 1506. Accordingly, the memory of the processors 1510, the memory/storage devices 1520, the peripheral devices 1504, and the databases 1506 are examples of computer-readable and machine-readable media.

EXAMPLES

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

Example 1

An apparatus of a wearable user equipment (wUE), the apparatus comprising circuitry to: process a discovery channel to obtain, from a network user equipment (nUE) during a first subframe, a discovery identifier (ID) message including a discovery ID associated with the nUE; detect the discovery ID in a scheduling assignment (SA) channel during one or more second subframes following the first subframe, the discovery ID indicating the nUE is scheduling resources for exchanging discovery content messages by which to transition the wUE from a power-saving mode (PSM) to a discovery state; and process a downlink (DL) data channel to obtain the discovery content messages and thereby cause the wUE to transition from the discovery state to a communication state for exchange of data with the nUE through an Xu-a air interface in a personal area network (PAN) with the nUE. The apparatus also optionally comprises transceiver circuitry.

Example 2

The apparatus of example 1, in which the circuitry is further configured to detect a period of inactive communication with the nUE and indicate the wUE transition to an idle state.

Example 3

The apparatus of example 1 or 2, in which the circuitry is further configured to transition to the PSM after being in an idle state.

Example 4

The apparatus of any of examples 1-3, in which the circuitry is further configured to: process DL data received from the nUE through the Xu-a air interface in a data channel of a scheduled subframe following the one of more second subframes; and in response to processing the DL data, generate an acknowledgement (ACK) for an ACK channel of the scheduled subframe.

Example 5

The apparatus of any of examples 1-4, in which each subframe includes a subchannel comprising scheduling assignment, data, and random access channels spaced apart by associated guard periods.

Example 6

The apparatus of any of examples 1-5, in which the first subframe includes a subchannel comprising synchronization signal (SS), broadcast, paging, and the discovery channels.

Example 7

The apparatus of any of examples 1-6, in which the discovery channel is temporally adjacent to a paging channel so as to define a paging and discovery channel having corresponding paging and discovery regions.

Example 8

The apparatus of any of examples 1-7, in which the first and the one or more second subframes include multiple subchannels, each of the subchannels having a bandwidth equal to that of six physical resource blocks (PRB).

Example 9

The apparatus of any of examples 1-8, in which the discovery ID identifies a channel of the one or more second subframes that includes a discovery content message.

Example 10

The apparatus of example 9, in which the circuitry is further configured to determine the channel based on a mapping defining a location of the channel based on the discovery ID.

Example 11

A method performed by a wearable user equipment (wUE), the method comprising: receiving from a network user equipment (nUE) a discovery identifier (ID) message provided in a discovery channel transmitted during a first subframe; in response to the discovery ID message, transitioning from a power-saving mode (PSM) to a discovery state for exchange of discovery content messages with the nUE, the discovery content messages transmitted in one or more second subframes following the first subframe; and in response to exchange of the discovery content messages, establishing an Xu-a air interface in a personal area network (PAN) with the nUE and transition to a communication state for exchange of data with the nUE through the Xu-a air interface.

Example 12

The method of example 11, further comprising transitioning to an idle state in response to a period of inactive communication with the nUE.

Example 13

The method of example 11 or 12, further comprising transitioning to the PSM after being in an idle state.

Example 14

The method of any of examples 11-13, further comprising: receiving from the nUE, through the Xu-a air interface, downlink (DL) data in a data channel of a scheduled subframe following the one of more second subframes; and in response to the DL data, transmitting an acknowledgement (ACK) in an ACK channel of the scheduled subframe.

Example 15

The method of any of examples 11-14, in which each subframe includes a subchannel comprising scheduling assignment, data, and random access channels spaced apart by associated guard periods.

Example 16

The method of any of examples 11-15, in which the first subframe includes a subchannel comprising synchronization signal (SS), broadcast, paging, and the discovery channels spaced apart by associated guard periods.

Example 17

The method of any of examples 11-16, in which the discovery channel is temporally adjacent to a paging channel so as to define a paging and discovery channel having corresponding paging and discovery regions.

Example 18

The method of any of examples 11-17, in which the first and the one or more second subframes include multiple subchannels, each of the subchannels having a bandwidth equal to that of six physical resource blocks (PRB).

Example 19

The method of any of examples 11-18, in which the discovery ID identifies a channel of the one or more second subframes that includes a discovery content message.

Example 20

The method of example 19, further comprising determining the channel based on a mapping defining a location of the channel based on the discovery ID.

Example 21

An apparatus of a network user equipment (nUE) comprising circuitry configured to: generate a discovery message in a discovery channel during a first subframe, the discovery message including a discovery identifier (ID) for a wearable user equipment (wUE); generate a scheduling assignment in a scheduling assignment channel during a second subframe, the scheduling assignment addressed to the discovery ID of the discovery message; generate discovery message content in a data channel of the second subframe; and in response to the wUE receiving the discovery message content and transmitting a random access (RA), process the RA obtained from the wUE in an RA channel of the second subframe. The apparatus also optionally comprises transceiver circuitry.

Example 22

The apparatus of example 21, in which the circuitry is configured to generate a paging message in a paging channel during the first subframe.

Example 23

The apparatus of example 21 or 22, in which the circuitry is configured select the discovery ID from a pool of predetermined discovery IDs.

Example 24

The apparatus of any of examples 21-23, in which the circuitry is configured to provide a synchronization signal (SS) in an SS channel of the first subframe.

Example 25

The apparatus of any of examples 21-24, in which the RA includes an RA identifier (RA-ID).

Example 26

The apparatus of any of examples 21-25, in which the circuitry is further configured to process a synchronization signal from an evolved Node B (eNB) to maintain synchronization in a personal area network (PAN) formed between the nUE and the wUE.

Example 27

A method performed by a network user equipment (nUE), comprising: transmitting to a wearable user equipment (wUE) a discovery message in a discovery channel during a first subframe, the discovery message including a discovery identifier (ID); transmitting a scheduling assignment in a scheduling assignment channel during a second subframe, the scheduling assignment addressed to the discovery ID of the discovery message; transmitting discovery message content in a data channel of the second subframe; and receiving a random access (RA) in an RA channel of the second subframe.

Example 28

The method of example 27, further comprising transmitting a paging message in a paging channel during the first subframe.

Example 29

The method of example 27 or 28, further comprising selecting the discovery ID from a pool of predetermined discovery IDs.

Example 30

The method of any of examples 27-29, further comprising providing a synchronization signal (SS) in an SS channel of the first subframe.

Example 31

The method of any of examples 27-30, in which the RA includes an RA identifier (RA-ID).

Example 32

The method of any of examples 27-32, further comprising receiving from an evolved Node B (eNB) a synchronization signal to maintain synchronization in a personal area network (PAN) formed between the nUE and the wUE.

Example 33

An apparatus of a wearable user equipment (wUE) comprising circuitry configured to: generate a random access (RA) to join a personal area network (PAN) including an Xu-a intra-PAN air interface for short-range wireless communication between the wUE and a network user equipment (nUE), the nUE including a protocol stack for accessing, through a Uu-p air interface between the nUE and a base station, control- and user-plane functions of a long-term evolution (LTE) wide area network (WWAN) comprising the nUE and the base station; process a scheduling assignment from the nUE; and generate uplink data for providing to the nUE through the Xu-a intra-PAN air interface during a scheduled subframe to facilitate the wUE in its communication with the LTE WWAN. The apparatus also optionally comprises transceiver circuitry.

Example 34

The apparatus of example 33, in which the wUE is a first wUE comprising circuitry configured to generate uplink data for providing to a second wUE in the PAN through a Xu-b intra-PAN air interface between the first and second wUEs.

Example 35

The apparatus of example 33 or 34, in which the circuitry is configured to communicate with the base station through a Uu-w air interface between the wUE and the base station.

Example 36

The apparatus of any of examples 33-35, in which the wUE is configured to process a synchronization signal from the base station for synchronizing the nUE and the wUE within one cluster.

Example 37

The apparatus of any of examples 33-36, in which the circuitry is configured to process subframes in a radio frame that is aligned for collision avoidance.

Example 38

The apparatus of any of examples 33-37, in which the circuitry is configured to perform blind detection.

Example 39

The apparatus of any of examples 33-38, in which the subframe comprises multiple guard periods, a scheduling assignment (SA) channel, a data transmission channel, and an acknowledgement (ACK) channel to signal feedback corresponding to data processed in the data transmission channel during a transmission within the subframe that includes the ACK channel.

Example 40

The apparatus of example 39, in which the subframe further comprises a scheduling assignment response (SAR) channel temporally adjacent a first guard period of the multiple guard periods, the first guard period located between the SA channel and the SAR channel.

Example 41

The apparatus of example 39, in which the subframe further comprises an RA channel temporally adjacent a first guard period of the multiple guard periods, the first guard period located between the SA channel and the RA channel.

Example 42

The apparatus of any of examples 33-41, in which the circuitry is configured to process from the nUE a message to configure a ratio of uplink and downlink subframes of a time-division duplex (TDD) radio frame structure.

Example 43

A method performed by a wearable user equipment (wUE), comprising: joining a personal area network (PAN) including an Xu-a intra-PAN air interface for short-range wireless communication between the wUE and a network user equipment (nUE), the nUE including a protocol stack for accessing, through a Uu-p air interface between the nUE and a base station, control- and user-plane functions of a long-term evolution (LTE) wide area network (WWAN) comprising the nUE and the base station; and communicat-

Example 44

The method of example 43, in which the wUE is a first wUE comprising circuitry configured to communicate with a second wUE in the PAN through a Xu-b intra-PAN air interface between the first and second wUEs.

Example 45

The method of example 43 or 44, further comprising communicating with the base station through a Uu-w air interface between the wUE and the base station.

Example 46

The method of any of examples 43-45, further comprising receiving from the base station a synchronization signal for synchronizing the nUE and the wUE within one cluster.

Example 47

The method of any of examples 43-46, further comprising receiving subframes in a radio frame that is aligned for collision avoidance.

48. The method of any of examples 43-47, further comprising performing blind detection.

Example 49

The method of any of examples 43-48, further comprising communicating with the nUE through a self-contained radio frame structure including a subframe, the subframe comprising multiple guard periods, a scheduling assignment (SA) channel, a data transmission channel, and an acknowledgement (ACK) channel to signal feedback corresponding to data received in the data transmission channel during a transmission within the subframe that includes the ACK channel.

Example 50

The method of example 49, in which the subframe further comprises a scheduling assignment response (SAR) channel temporally adjacent a first guard period of the multiple guard periods, the first guard period located between the SA channel and the SAR channel.

Example 51

The method of example 59, in which the subframe further comprises a random access (RA) channel temporally adjacent a first guard period of the multiple guard periods, the first guard period located between the SA channel and the RA channel.

Example 52

The method of any of examples 43-51, further comprising receiving from the nUE a message to configure a ratio of uplink and downlink subframes of a time-division duplex (TDD) radio frame structure.

Example 53

A method of state transition for intra-PAN communication as defined in FIG. 2.

Example 54

A method of frame structure for intra-PAN communication as defined in FIG. 3.

Example 55

A method of numerology and subframe length considering implementation complexity and overhead.

Example 56

A method of subframe structure for intra-PAN communication as defined in FIG. 4, 5, 6, or 7.

Example 57

A method of self-contained frame structure for intra-PAN communication.

Example 58

A method of collision avoidance signal exchange procedure within each subframe.

Example 59

A method L1 procedure for intra-PAN communication as defined in FIG. 8.

Example 60

A method of paging and discovery channel as defined in FIG. 9.

Example 61

A method to define discovery ID pool for discovery.

Example 62

A method of discovery message multiplexed in user traffic as illustrated in FIG. 10.

Example 63

A method of subframe for discovery message as defined in FIG. 11.

Example 64

A method of discovery procedure and random access procedure as defined in FIG. 12.

Example 65

An apparatus comprising means to perform one or more elements of a method described in or related to any of examples 11-20, 27-32, or 43-64, and/or any other method or process described herein.

Example 66

One or more non-transitory (or transitory) computer-readable media comprising instructions to cause an electronic device, upon execution of the instructions by one or more processors of the electronic device, to perform one or more elements of a method described in or related to any of examples 11-20, 27-32, or 43-64, and/or any other method or process described herein.

Example 67

An apparatus comprising control logic, transmit logic, and/or receive logic to perform one or more elements of a method described in or related to any of examples 11-20, 27-32, or 43-64, and/or any other method or process described herein.

Example 68

A method of communicating in a wireless network as shown and described herein.

Example 69

A system for providing wireless communication as shown and described herein.

Example 70

A device for providing wireless communication as shown and described herein.

Skilled persons will understand that many changes may be made to the details of the above-described embodiments without departing from the underlying principles of the invention. For example, a plurality of items, structural elements, compositional elements, and/or materials may be presented in a common list for convenience. Lists, however, should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations of embodiments. The scope of the present invention should, therefore, be determined only by the following claims.

The invention claimed is:

1. An apparatus of a wearable user equipment (wUE), the apparatus comprising circuitry to:
   process a discovery channel to obtain, from a network user equipment (nUE) during a first subframe, a discovery identifier (ID) message including a discovery ID associated with the nUE;
   detect the discovery ID in a scheduling assignment (SA) channel during one or more second subframes following the first subframe, the discovery ID indicating the nUE is scheduling resources for exchanging discovery content messages by which to transition the wUE from a power-saving mode (PSM) to a discovery state; and
   process a downlink (DL) data channel to obtain the discovery content messages and thereby cause the wUE to transition from the discovery state to a communication state for exchange of data with the nUE through an Xu-a air interface in a personal area network (PAN) with the nUE.

2. The apparatus of claim 1 in which the circuitry is further configured to detect a period of inactive communication with the nUE and indicate the wUE transition to an idle state.

3. The apparatus of claim 1, in which the circuitry is further configured to transition to the PSM after being in an idle state.

4. The apparatus of claim 1, in which the circuitry is further configured to:
   process DL data received from the nUE through the Xu-a air interface in a data channel of a scheduled subframe following the one of more second subframes; and
   in response to processing the DL data, generate an acknowledgement (ACK) for an ACK channel of the scheduled subframe.

5. The apparatus of claim 1, in which each subframe includes a subchannel comprising scheduling assignment, data, and random access channels spaced apart by associated guard periods.

6. The apparatus of claim 1, in which the first subframe includes a subchannel comprising synchronization signal (SS), broadcast, paging and the discovery channels.

7. The apparatus of claim 1, in which the discovery channel is temporally adjacent to a paging channel so as to define a paging and discovery channel having corresponding paging and discovery regions.

8. The apparatus of claim 1, in which the first and the one or more second subframes include multiple subchannels, each of the subchannels having a bandwidth equal to that of six physical resource blocks (PRB).

9. The apparatus of claim 1, in which the discovery ID identifies a channel of the one or more second subframes that includes a discovery content message.

10. The apparatus of claim 9, in which the circuitry is further configured to determine the channel based on a mapping defining a location of the channel based on the discovery ID.

11. An apparatus of a network user equipment (nUE) comprising circuitry configured to:
   generate a discovery message in a discovery channel during a first subframe, the discovery message including a discovery identifier (ID) for a wearable user equipment (wUE);
   generate a scheduling assignment in a scheduling assignment channel during a second subframe, the scheduling assignment addressed to the discovery ID of the discovery message;
   generate discovery message content in a data channel of the second subframe; and
   in response to the wUE receiving the discovery message content and transmitting a random access (RA), process the RA obtained from the wUE in an RA channel of the second subframe.

12. The apparatus of claim 11, in which the circuitry is configured to generate a paging message in a paging channel during the first subframe.

13. The apparatus of claim 11, in which the circuitry is configured select the discovery ID from a pool of predetermined discovery IDs.

14. The apparatus of claim 11, in which the circuitry is configured to provide a synchronization signal (SS) in an SS channel of the first subframe.

15. The apparatus of claim 11, in which the RA includes an RA identifier (RA-ID).

16. The apparatus of claim 11, in which the circuitry is further configured to process a synchronization signal from an evolved Node B (eNB) to maintain synchronization in a personal area network (PAN) formed between the nUE and the wUE.

\* \* \* \* \*